United States Patent
Haas

(10) Patent No.: US 7,341,638 B2
(45) Date of Patent: Mar. 11, 2008

(54) USE OF A LOW BINDER FIBER MAT WITH A SUPPORT MAT FOR FABRICATING A FIBER REINFORCED POLYMERIC FOAM COMPOSITE

(75) Inventor: James Lynn Haas, Livermore, CA (US)

(73) Assignee: Dow Global Technologies Inc., Midland, MI (US)

( * ) Notice: Subject to any disclaimer, the term of this patent is extended or adjusted under 35 U.S.C. 154(b) by 574 days.

(21) Appl. No.: 10/615,746

(22) Filed: Jul. 9, 2003

(65) Prior Publication Data

US 2004/0053035 A1 Mar. 18, 2004

Related U.S. Application Data

(60) Provisional application No. 60/411,819, filed on Sep. 17, 2002.

(51) Int. Cl.
*B29C 65/00* (2006.01)
*B32B 5/20* (2006.01)
*B32B 5/28* (2006.01)

(52) U.S. Cl. ........................ 156/79; 264/46.5
(58) Field of Classification Search ............ 156/78–79; 264/46.5

See application file for complete search history.

(56) References Cited

U.S. PATENT DOCUMENTS

| | | | |
|---|---|---|---|
| 3,382,302 A | | 5/1968 | Marzocchi |
| 4,028,158 A | * | 6/1977 | Hipchen et al. ............... 156/79 |
| 4,028,958 A | | 6/1977 | Schuermann et al. |
| 4,118,533 A | | 10/1978 | Hipchen et al. |
| 4,242,409 A | | 12/1980 | Parker |
| 4,279,958 A | | 7/1981 | Ahmad |
| RE30,984 E | | 6/1982 | Hipchen et al. |
| 4,414,265 A | | 11/1983 | Rosato et al. |
| 4,572,865 A | | 2/1986 | Gluck et al. |
| 4,804,425 A | * | 2/1989 | Hoffmann et al. ......... 156/73.6 |
| 5,091,436 A | | 2/1992 | Frisch et al. |
| 5,789,458 A | | 8/1998 | Londrigan et al. |
| 5,837,743 A | | 11/1998 | Londrigan et al. |
| 6,030,559 A | | 2/2000 | Barry et al. |

\* cited by examiner

*Primary Examiner*—Jeff H. Aftergut
*Assistant Examiner*—Michael A Tolin
(74) *Attorney, Agent, or Firm*—Steven W. Mork

(57) ABSTRACT

A process for preparing a fiber reinforced polymeric foam composite includes introducing a foamable mixture into a low binder expandable fiber mat and then expanding the foamable mixture into a polymeric foam between top and bottom facing sheets such that the fibers of the low binder fiber mat become dispersed within the polymeric foam, wherein the low binder fiber mat is part of a composite web that further comprises a support web. Such a composite web is particularly useful for preparing reinforced polymeric foam composites that contain a fiber reinforced polymeric foam having a thickness of greater than two inches (5.08 centimeters) and fibers substantially distributed therein.

3 Claims, No Drawings

US 7,341,638 B2

USE OF A LOW BINDER FIBER MAT WITH A SUPPORT MAT FOR FABRICATING A FIBER REINFORCED POLYMERIC FOAM COMPOSITE

CROSS REFERENCE STATEMENT

This application claims the benefit of U.S. Provisional Application No. 60/411,819, filed Sep. 17, 2002.

BACKGROUND OF THE INVENTION

1. Field of the Invention

The present invention relates to fiber-reinforced polymeric foam composites and their manufacture.

2. Description of Related Art

Polymeric foam composites comprise a polymeric foam sandwiched between facing materials. Polymeric foam composites are useful as wall and ceiling panels in a wide variety of structures to provide thermal and acoustical insulation, fire retardation, and structural rigidity. Manufacturing polymeric foam composites typically involves disposing a foamable mixture between two continuous conveying sheets of facing materials and then foaming the foamable mixture into a polymeric foam.

A desirable polymeric foam composite contains fibers dispersed within the polymeric foam (a fiber reinforced polymeric foam). Fiber reinforced polymeric foams can have enhanced physical and performance properties such as increased thermal dimensional stability, strength and fire resistance. One way to prepare a polymeric foam composite containing a fiber reinforced polymeric foam is by conveying an expandable fiber mat filled with foamable mixture between the two sheets of facing material and then expanding the foamable mixture into a polymeric foam. The expandable fiber mat expands with the foamable mixture during the foam forming step. Unfortunately, there are weaknesses associated with current expandable fiber mat technology.

Expandable fiber mats contain a binder that holds them together during processing. Generally, fiber mats having a binder level above six percent by weight of binder and fiber (i.e., based on total mat weight) require mechanical fracturing of the fibers or binder in the mat in order to render the mat expandable. Such mechanical fracturing typically involves corrugation (e.g., crimping or crinkling) of the fiber mat. Corrugating a fiber mat can cause it become sufficiently inhomogeneous in its composition so as to cause ridges or necking, often resulting in polymeric foam composites that can have a non-uniform appearance. Additionally, because corrugation is typically an operator controlled process step, inconsistency in the extent of corrugation (and hence, inconsistency in fiber dispersion in the polymeric foam) can occur during fabrication, particularly when operator shifts change.

Low binder fiber mats (fiber mats containing less than six percent binder, based on total mat weight) are desirable because they are expandable without requiring corrugation. Unfortunately, low binder fiber mats are difficult to implement in standard fabrication processes. For example, a low binder fiber mat tends to bind to itself when in a roll, causing the mat to pull apart upon unrolling. Low binder fiber mats also tend to coat roller(s) that they contact with loose fibers. As a result, roller(s) require frequent cleaning or the fibers coating the roller(s) can cause low binder fiber mats to pull apart as they travel over the roller(s). Additionally, low binder fiber mats tend to have insufficient tensile strength to suitably convey in a continuous polymeric foam composition fabrication process.

A process for preparing polymeric foam composites that uses a low binder fiber mat but does not experience the aforementioned difficulties associated with low binder fiber mats is desirably.

BRIEF SUMMARY OF THE INVENTION

In a first aspect, the present invention is a process for fabricating a reinforced polymeric foam composite comprising introducing a foamable mixture into a low binder fiber mat and then expanding the foamable mixture into a polymeric foam between top and bottom facing sheets such that the fibers of the low binder fiber mat become dispersed within the polymeric foam, wherein the low binder fiber mat is part of a composite web that further comprises a support mat. The process can further comprise a second composite web that contains a second low binder fiber mat, which has the foamable mixture dispersed therein, disposed on a second support mat that is permeable by the foamable mixture, the second composite web being oriented either (a) with the second support mat proximate to and above the low binder fiber mat of the first composite web or (b) with the second low binder fiber mat adjacent to the low binder fiber mat of the first composite web.

In a second aspect, the present invention is a fiber reinforced polymeric foam between a top and bottom facing sheet; wherein said fiber reinforced polymeric foam composite is characterized by containing an expanded composite web, as is evidenced by the presence of a support mat and by having low binder fiber mat substantially distributed in the reinforced polymeric foam.

DETAILED DESCRIPTION OF THE INVENTION

An object of the present invention is to identify a process for fabricating a reinforced polymeric foam composite using a low binder fiber mat without the aforementioned difficulties associated with using low binder fiber mats.

It is another object of the present invention to provide a fiber reinforced polymeric foam composite that has a fiber reinforced polymeric foam with fibers substantially distributed therein, particularly when the fiber reinforced polymeric foam has a thickness of greater than two inches (5.08 centimeters (cm)).

Conceivably, a low binder fiber mat can comprise a single long fiber folded and wrapped back on itself and bound together with a binder. Typically, low binder fiber mats comprise multiple fibers held together by a binder. Suitable fibers include glass fibers, polymer fibers, ceramic fibers, metal fibers, and organic fibers such as cotton or wool. Desirably, the fibers are glass fibers. Low binder mats desirably comprise long fibers, generally greater than one foot (30.5 centimeters (cm)), preferably greater than five feet (152.4 cm), in length. Longer fibers tend to enhance dimensional stability in a fiber reinforced foam more readily than shorter fibers. Low binder fiber mats can have many different fiber arrangements and this invention is not limited to any particular fiber arrangement, as long as the fiber mats contain interstices that are penetrable by a foamable mixture.

Low binder fiber mats are expandable without requiring fracturing of fibers or binder within the mat. An expandable fiber mat expands, increasing the distance between fibers, as a foamable mixture penetrating the interstices of the mat expands (foams). Binder holds fibers within a fiber mat together, hindering fiber mat expansion. Therefore, decreasing binder levels is desirable to facilitate fiber mat expansion. Fiber mats containing more than about six percent binder, by weight of total mat weight, typically require fracturing of the binder, fibers or both in order to render the fiber mat expandable. Desirably, low binder fiber mats for use in the present invention do not undergo corrugation, crimping, or other similar mechanical fracturing of fibers or binder prior to expansion.

Desirably, low binder fiber mats of the present invention have four percent or less, more preferably three percent or less, still more preferably two percent or less binder based on total mat weight. Typically, low binder fiber mats contain some binder (i.e., more than zero percent) to facilitate handling, but theoretically need not have any binder. Often, low binder fiber mats will have one percent or more binder, based on total mat weight.

Binder refers to those materials that bind fibers together in a pre-expanded mat. As an example, a silane modified polyester is a desirable binder for use with glass fibers. Binders do not include, for example, a polymer foam in a fiber reinforced polymer foam. A skilled artisan can recognize suitable binders for use with a specific type of fiber.

The present invention resolves difficulties associated with handling low binder fiber mats by using a composite web. A composite web comprises a low binder fiber mat disposed onto a support mat prior to conveying either the low binder fiber mat or the support mat into a fiber reinforced foam fabrication process. In a composite web, a major surface of a low binder fiber mat contacts a major surface of a support mat. A "major surface" of an object is a surface having the largest dimensions. Mats generally have opposing major surfaces. A composite web can contain one, or more than one, support mat. A single support mat can span at least a portion of a major surface of a low binder fiber mat. Alternatively, two or more support mats can span at least a portion of a major surface of a low binder fiber mat. The support mat(s) of a composite web serve to allow handling and conveying of a low binder fiber mat without stretching the low binder fiber mat sufficiently to observe necking or ridging. The support mat also hinders low binder fiber mat in rolls of composite web from contacting itself, thereby minimizing pulling apart of the low binder fiber mat upon unrolling. The support mat also can prevent fibers from the low binder fiber mat from contacting rollers during the fabrication process of fiber reinforce polymeric foam composites.

A skilled artisan can identify numerous combinations of support mat configurations that are suitable for use in a composite web. Desirably, a composite web contains a single support mat that covers at least 50 percent, preferably at least 90 percent, more preferably 100 percent of a low binder fiber mat's major surface. A support mat of a composite web can have a larger dimension (e.g., have a larger width) than a low binder fiber mat of the same composite web.

Desirably, a low binder fiber mat of a composite web adheres to a support mat. Such adhesion enhances handleability of the composite web by, for example, hindering slippage of the low binder fiber mat relative to the support mat. Adhesion between a low binder fiber mat and a support mat can result from many different means including adhesives and mechanical adhesion. When using an adhesive, the amount of adhesive is insufficient to prevent foamable mixture from entering interstices between fibers of the low binder fiber mat or to prevent expansion of the fibers during foaming. Often the binder already in a low binder fiber mat is sufficient to adhere a fiber mat to a support mat. Mechanical adhesion can result from, for example, intermingling of fibers from a low binder fiber mat and a fiber scrim support mat. Desirably, such mechanical adhesion is releasable without pulling apart of the fiber mat.

A low binder fiber mat can releasable adhere to a support mat to achieve benefits of adhesion during handling while allowing fibers of the low binder fiber mat to be free from the support mat in a final fiber reinforced polymeric foam composite. For example, an adhesive that is soluble in a foamable mixture can adhere a low binder fiber mat to a support mat, yet dissolve as a foamable mixture foams through the support mat.

As an additional benefit of using a composite web, fabrication processes of the present invention can use rolls of composite web containing more length of low binder fiber mat than a roll of just low binder fiber mat. Longer length rolls are desirable because changing rolls of reinforcement fiber without slowing production, producing lower quality product, or both is difficult. Composite webs can tolerate tighter rolling than low binder fiber mats alone, allowing a longer length of web on a single roll of a specific diameter. Without the support mat of a composite web, a roll of low binder fiber tends to pull itself apart upon unrolling, resulting in non-uniform fiber mat. This difficulty worsens by winding a roll of low binder fiber mat tighter, therefore, rolls of low binder fiber mat alone are relatively loosely wound.

Support mats fall into one of two categories, non-penetrable and penetrable by a foamable mixture. Non-penetrable support mats of a composite web also serve as at least part of a facing sheet for a reinforced polymeric foam composite. Non-penetrable support mats include those materials typically used as facing sheets, particularly flexible facing sheets. Examples of non-penetrable support mats include flexile metal sheet (e.g., aluminum foil), paper, paperboard, plastic foils, asphalt-saturated felt, fiberglass sheet, and impenetrable fiber mats that are not wet through by a foamable mixture (such as those disclosed in U.S. Pat. No. 4,572,865 (incorporated herein by reference)). Penetrable support mats allow a foamable mixture to expand through them as the mixture foams. Examples of penetrable support mats include fiber scrims, netting, and even porous paper or sheet materials.

Reinforced polymeric foam composites have facing sheets on opposing major surfaces. Examples of suitable facing sheets include impenetrable support mats, see above. Additional examples of suitable facing sheets include those in U.S. Pat. No. 4,572,865 (column 15, line 60 through column 16, line 9; incorporated herein by reference), U.S. Pat. No. 5,789,458 (column 12, lines 20-35; incorporated herein by reference), and U.S. Pat. No. 6,030,559 (column 4, lines 50-65; incorporated herein by reference). Particularly desirable are facing sheets that enhance thermal resistance through a reinforced polymeric foam composite including metal sheet, such as aluminum foil.

A skilled artisan can find many methods for preparing a polymeric foam composite suitable for use, in combination with a composite web, as part of the present invention. For example, U.S. Pat. Nos. 4,118,533; 4,837,743; and 4,028,958 (each incorporated herein by reference) provide suitable teachings on process for fabricating reinforced foam composites that, when modified to include a composite web, are suitable as processes of the present invention.

Include a composite web into the process of the present invention between a top facing sheet and a bottom facing sheet. Desirably, convey a composite web from a roll in a manner similar to a facing sheet or fiber mat. A process that includes a composite web can also include other components such as scrims and fiber mats apart from the composite web. In general, a composite web's orientation relative to other components is only limited to being between a top sheet and a bottom sheet. Some orientations, however, are more desirable than others.

Optimal thermal dimensional stability (i.e., dimensional stability over a temperature range) occurs when both a top facing sheet and a bottom facing sheet either are a scrim or are adjacent to a scrim. There are several ways to achieve such an structure using a composite web. For example, orient two composite webs that have scrim support mats so that they face one another, with the support mat of one composite web adjacent to a top facing sheet and the support mat of the other composite web adjacent to a bottom facing sheet. Alternatively, orient a scrim support mat of a composite web against a facing sheet and a scrim that is apart from a composite web against the other facing sheet.

Fiber reinforced polymeric foam composites demonstrate desirable flame retardancy when flame retarding fibers (e.g., glass fibers) are substantially distributed from the top facing sheet to the bottom facing sheet. Even a thin layer of polymeric foam adjacent to a facing sheet that does not contain flame retarding fibers can reduce the flame retardancy of the foam composite. Fiber distribution optimally occurs to the facing sheets when there is no other mat or scrim between an expandable fiber mat and a facing sheet. For example, orient two composite webs such that their support mats are adjacent to one another and their expandable fiber mats contact opposing facing sheets. Alternatively, convey an expandable mat onto a bottom facing sheet and then convey a composite web onto the expandable mat such that the low binder fiber mat of the composite web is adjacent to a top facing sheet. An inverse orientation is also possible by conveying a composite web onto a bottom facing sheet with the expandable fibers adjacent to the facing sheet and then conveying another expandable fiber mat onto the support mat of the composite web with a top facing sheet contacting the expandable fiber mat.

While these are examples of orientations for a composite web for use in the present invention, a skilled artisan recognizes they are not limiting. For example, orientations where a support mat of a composite web is adjacent to a facing sheet, the support mat and facing sheet can be one and the same. Furthermore, a process of the present invention can include any number of composite webs. Desirably, the present invention includes at least one composite web for every two inches (5.08 cm) of reinforced polymeric foam thickness.

The process of the present invention comprises introducing a foamable mixture into interstices of a low binder expandable fiber mat of a composite web and then foaming the foamable mixture into a polymeric foam between top and bottom facing sheets. The fibers of the low binder fiber mat become dispersed within the polymeric foam. Addition of foamable mixture can occur onto any component, or components, that make up the fiber reinforced polymeric composite provided that the foamable mixture is between a top and bottom facing.

Introduction of foamable mixture into interstices of the low binder fiber mat can occur in any of the ways known in the art for impregnating a fiber mat with a foamable mixture. For example, foamable mixture can wet the fiber(s) of a low binder fiber mat and spontaneously fill interstices upon contacting the low binder fiber mat. Using force to drive foamable mixture into the interstices of a low binder fiber mat is also acceptable. For example, a process comprising constricting a combination of foamable mixture and low binder fiber mat by conveying through a metering gap can be useful for introducing a foamable mixture into interstices of the low binder fiber mat.

Foamable mixtures for use in the present invention are mixtures that produce a rigid, flexible or semi-rigid polymeric foam. The polymeric foam can comprise a thermoplastic polymer, thermoset polymer, or both. Suitable polymers include polyurethane, polyisocyanurate, phenolic, rubber, polyvinyl chloride, urea-aldehyde, melamine-aldehyde, polystyrene, polycarbonates, polyetherimides, polyamide, polyester, polyvinylidene chloride, polymethyl-methacrylate, polypropylene, polyethylene, cellulose acetate, epoxy, acrylonitrile-butadiene-styrene copolymer, and silicone. Desirably, the polymer is selected from a group consisting of polyurethane and polyisocyanurate. Foamable mixtures for producing polyurethane and polyisocyanurate foams typically include an organic polyisocyanate, a polyol, a catalyst, and a frothing or blowing agent. Suitable examples of foamable mixtures for producing polyurethane and polyisocyanurate foams are in U.S. Pat. No. 4,572,865 (column 9, line 48 through column 15, line 59; incorporated herein by reference) and U.S. Pat. No. 5,789,458 (incorporated herein by reference).

It is often desirable, particularly in polyurethane and polyisocyanurate foam processes, to heat the foamable mixture to accelerate foaming and curing. One effective way to heat a foamable mixture in the present process is by conveying it through an oven.

Desirably, foams resulting from the process of the present invention contain at least two grams per square foot ($g/ft^2$) (21.5 grams per square meter ($g/m^2$)), preferably 8 $g/ft^2$ (86.1 $g/m^2$) or more, more preferably 14 $g/ft^2$ (150.7 $g/m^2$) or more of fiber from an expandable fiber mat. If the foam is for use in an application with guidelines or codes that specify a certain fiber content, a foam from the process of the present invention for that application will optimally meet those guidelines or codes. There is no identified upper limit as to how much fiber is present in a foam provided the foam contains sufficient foamable mixture to hold the fibers together and the expandable fiber mat supplying the fibers is sufficiently permeable to allow a foamable mixture to penetrate with it. Included in the total amount of expandable fiber mat is low binder expandable fiber mat that is part of a composite web as well as any additional expandable fiber mats.

The following examples of preferred variations of the presently claimed process provide further teachings of how to include a composite web into a polymeric foam composite process.

One embodiment of the present invention comprises the steps (a) conveying a length of a first composite web containing an low binder fiber mat disposed onto a support mat; (b) dispersing a foamable mixture onto the low binder fiber mat of the composite web; (c) conveying a length of top facing sheet such that the low binder fiber mat and foamable mixture are between the support mat and top facing sheet; (d) constricting the support mat and top facing sheet through a metering gap, achieving penetration of the foamable mixture into the low binder fiber mat; and (e) expanding the foamable mixture into a polymeric foam.

In a first variation, the process of the first embodiment can further comprise conveying a second composite web containing an low binder fiber mat and a support mat onto the foamable mixture prior to step (c) such that the support mat of the second composite web is adjacent to the foamable mixture; wherein the second composite is between the top facing sheet and low binder fiber mat of the first composite web after step (d).

The process of the first embodiment, or first variation thereof, can further comprise prior to step (a), conveying a length of bottom facing sheet onto which the support mat of the first composite mat is conveyed in step (a); wherein step (d) further comprises constricting the top and bottom facing sheet through the metering gap and either the support mat of the first composite web is penetrable by the foamable mixture or becomes adhesively affixed to the bottom facing sheet.

The present invention also includes processes that include use of other expandable fiber mats in combination with a composite web. "Other expandable fiber mat" refers to an expandable fiber mat other than a low binder fiber mat that is part of a composite web. For example, in a second embodiment, the process of the present invention comprises the steps: (a) conveying a length of bottom facing sheet; (b) conveying above the bottom facing sheet a first expandable fiber mat; (c) conveying above the expandable fiber mat a composite web oriented such that the composite web's support mat is below its low binder fiber mat; (d) conveying a length of top facing sheet above the composite web; (e) dispensing a foamable mixture between at least one of: (i) the bottom facing sheet and the first expandable mat, if dispensing occurs prior to step (b); (ii) the first expandable fiber mat and the support mat of the composite web, if dispensing occurs after step (b) and prior to step (c); and (iii) the composite web's low binder fiber mat and the top facing sheet, if dispensing occurs after step (c); (f) constricting the bottom and top facing sheet between a metering, achieving penetration of the foamable mixture into the first expandable fiber mat and low binder fiber mat and (g) causing the foamable mixture to expand into a polymeric foam. Step (d) provides for dispensing foamable mixture at different times, relative to steps (b) and (c). Dispensing of foamable mixture can occur at any one, or more than one, of steps (i), (ii), and (iii). The first expandable fiber mat can be part of a composite web or not part of a composite web. "Above" refers to the direction a top sheet is from a bottom sheet. Similarly, "below" refers to the direction a bottom sheet is from a top sheet.

The present invention is well suited for preparing reinforced polymeric foam composites that contain polymeric foams having fibers substantially distributed therein. A polymeric foam has fibers "substantially distributed" therein if any plane parallel to the foam's opposing major surfaces intersects at least one fiber, preferably multiple fibers or a single fiber multiple times. A polymeric foam that has fiber substantially distributed therein typically appears to an unaided eye to have a uniform distribution of fibers from an expandable fiber mat distributed from one major surface to an opposing major surface. Substantially distributing fiber within a foam tends to increase strength properties and, when the fibers are flame retardant (e.g., glass) increased flame retardant properties of the foam.

It becomes increasingly difficult to prepare polymeric foams having fibers substantially distributed therein using expandable fiber mats as the thickness of the foam increases. Thickness is the spacing between opposing major surfaces of a foam. It is particularly difficult to prepare a fiber reinforced foam having fibers substantially distributed therein at a thickness of greater than two inches (5.08 cm) because a single expandable fiber mat tends not to expand beyond that thickness. Apart from the present invention, processes tend to produce fiber reinforced foams that have visibly fewer, even an absence of fibers near the top major surface, particularly when the foam has a thickness in excess of two inches (5.08 cm). The top major surface is that surface most remote from the bottom facing sheet in a polymeric foam composite. An absence of fibers near a major surface of a fiber reinforced polymeric foam can result in undesirably low flame retardant properties for the polymeric foam.

The process of the present invention produces fiber reinforced polymeric foam composites comprising a fiber reinforced polymeric foam between a top and bottom facing sheet, wherein the fiber reinforced polymeric foam contains an expanded composite web. An expanded composite web is a composite web whose low binder expandable fiber mat is in an expanded form within a foamable mixture. Fiber reinforced polymeric foam composites prepared by the process of the present invention can contain a fiber reinforced polymeric foam that simultaneously has a thickness of greater than two inches (5.08 cm) and have fibers substantially distributed therein.

The following examples further illustrate variations of the present invention.

EXAMPLE

Ex 1

Expandable Fibers of Composite Web Proximate to Top Sheet

Convey top and bottom facing sheets of 1 mil (0.0254 millimeter) thick aluminum foil from rolls of facing material to between a nip of two metering rolls. Convey a first fiber mat from a third roll through a corrugator onto the bottom facing sheet prior to the nip. The first fiber mat is a glass mat having 6.3 percent of binder, based on total mat weight, and weighs 7.0 g/ft$^2$ (75.3 g/m$^2$). From a fourth roll, convey a composite web having an expandable glass fiber mat disposed onto a glass fiber scrim (JW70x54WS, roll # 18398 from Hollinee Glass Fibers). The expandable glass fiber mat has 2.8 percent binder, based on total mat weight, and weighs 7.0 g/ft$^2$ (75.3 g/m$^2$). The glass fiber is a mesh having a woven glass fibers at a spacing of 3 fibers per inch in orthogonal direction. The glass fiber scrim weighs 2.0 g/ft2 (21.5 g/m$^2$). Convey the composite web so that the expandable glass fiber is between the top and bottom facing sheets and contacts the top facing sheet at the nip of the metering rolls. Each of the facing sheets, first expandable fiber mat and composite web are approximately 54 inches (137.16 cm) wide.

Dispose onto the first fiber mat a foamable mixture just prior to the nip of the metering rolls. Form the foamable mixture by mixing together: 223 parts Polymethylene polyphenylisocyanate having an equivalent weight of 138 (Mondur MR 200, Bayer Corporation), 74.3 parts aromatic polyester polyol having an equivalent weight of 135 (Terate 2541A, Losa Corporation), 34.2 parts blowing agent (Forane 141b, Ato Chem Corporation), 2.0 parts surfactant (Niax Y-10874, Union Carbide), and 2.4 parts catalyst (Pelcat 9840, Pelron Corporation). All parts are parts by weight.

Compress the top and bottom facing sheets together at the nip of the metering rolls, forcing the foamable mixture through the composite web and first fiber mat, to form a compressed composition. Convey the compressed composition through a curing oven at 215 to 220 degrees Fahrenheit. Allow the compressed composition to expand to a thickness of 4.25 inches (10.8 cm) and a width of approximately 53 inches (134.62 cm). Expansion and curing produces a fiber reinforced polymeric foam composite (Ex. 1).

Ex. 1 illustrates a fiber reinforced polymeric foam composite that is over 4 inches (10.16 cm) thick that includes a fiber reinforced polymeric foam containing an expanded composite web. The fiber reinforced polymeric foam contains expandable fibers substantially distributed therein. To an unaided eye, the expandable fibers appear uniformly distributed within a cross-section of the fiber reinforced polymeric foam.

Ex. 1 further illustrates a fiber reinforced polymeric foam composite that contains a fiber reinforced polymeric foam having a glass scrim centrally located within the polymeric foam and having expanded glass fiber between both the scrim and top facing sheet as well as the scrim and bottom facing sheet. As such, fibers extend all the way to the facing sheets.

Ex 2

Scrim of Composite Web Proximate to Top Sheet

Prepare a fiber reinforced polymeric foam composite in manner similar to Ex. 1 except orient the composite web such that the glass scrim is adjacent to the top sheet.

Ex. 2 illustrates a fiber reinforced polymeric foam composite that is over 4 inches (10.16 cm) thick that includes a fiber reinforced polymeric foam that contains an expanded composite web. The fiber reinforced polymeric foam of the Ex. 2 contains 14 g/ft$^2$ (150.6 g/m$^2$) of expanded fiber that is uninterrupted with a fiber scrim or other support mat.

Ex. 2 further illustrates a fiber reinforced polymeric foam composite that has a pattern on a facing sheet. The top facing sheet reveals a pattern of the glass scrim that is adjacent to it.

What is claimed is:

1. A process for fabricating a fiber reinforced polymeric foam composite comprising the steps:
    a) conveying a length of bottom facing sheet;
    b) conveying above the bottom facing sheet a first expandable fiber mat;
    c) conveying above the expandable fiber mat a composite web from a roll; the composite web comprising a low binder fiber mat and a support mat and oriented such that the support mat is below the low binder fiber mat;
    d) conveying a length of top facing sheet above the composite web;
    e) dispensing a foamable mixture between at least one of:
        (i) the bottom facing sheet and first expandable mat, if dispensing occurs prior to step (b);
        (ii) the first expandable fiber mat and support mat of the composite web, if dispensing occurs after step (b); and prior to step (c); and
        (iii) the composite web's low binder fiber mat and top sheet, if dispensing occurs after step (c);
    f) constricting the bottom and top facing sheet through a metering gap, achieving penetration of the foamable mixture into the expandable fiber mat and low binder fiber mat; and
    g) expanding the foamable mixture into a polymeric foam.

2. The process of claim 1, wherein the first expandable fiber mat is part of a second composite web.

3. The process of claim 1, wherein the bottom facing sheet is part of a second composite web that contains the first expandable fiber mat and wherein steps (a) and (b) are accomplished simultaneously by conveying the composite web containing the bottom facing sheet and first expandable fiber mat.

* * * * *